United States Patent [19]

Rasmussen

[11] Patent Number: 5,020,267
[45] Date of Patent: Jun. 4, 1991

[54] VORTEX DIVER

[76] Inventor: Francis R. Rasmussen, 910 Ocho Rios Dr., Danville, Calif. 94526

[21] Appl. No.: 547,171

[22] Filed: Jul. 2, 1990

[51] Int. Cl.$^5$ .............................................. A01K 91/00
[52] U.S. Cl. ..................................... 43/43.13; 43/42.5
[58] Field of Search ................... 43/43.13, 9.7, 43.12, 43/27.4, 42.5

[56] References Cited

U.S. PATENT DOCUMENTS

| | | | |
|---|---|---|---|
| 2,726,475 | 12/1955 | Wiselka | 43/43.13 |
| 3,535,815 | 10/1970 | Lowndes | 43/43.12 |
| 3,543,431 | 12/1970 | Olds | 43/43.13 |
| 3,762,088 | 10/1973 | Bainton | 43/42.5 |
| 3,881,271 | 5/1975 | Jacura | 43/42.5 |
| 4,769,940 | 9/1988 | Doss | 43/42.5 |

Primary Examiner—Richard K. Seidel
Assistant Examiner—Chuck Y. Mah

[57] ABSTRACT

A towed diving hydrodynamic body with a curved down narrow nose to cause flow separation below the body that provides stable operation at all operating angles. The diver having straight lateral edges with sharp corners for generating strong shedding vortices that produce vibrations of the body that generate pressure waves and also visual reflections for attracting fish. Greater pull down forces are generated enabling the diver to reach greater depths and the same body also provides a means for attracting fish.

4 Claims, 1 Drawing Sheet

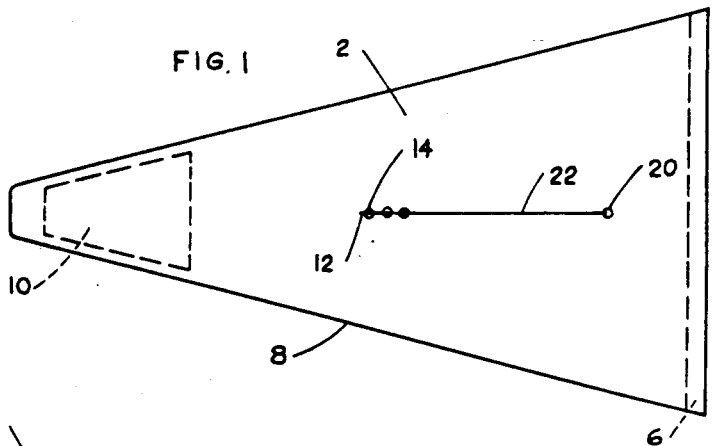
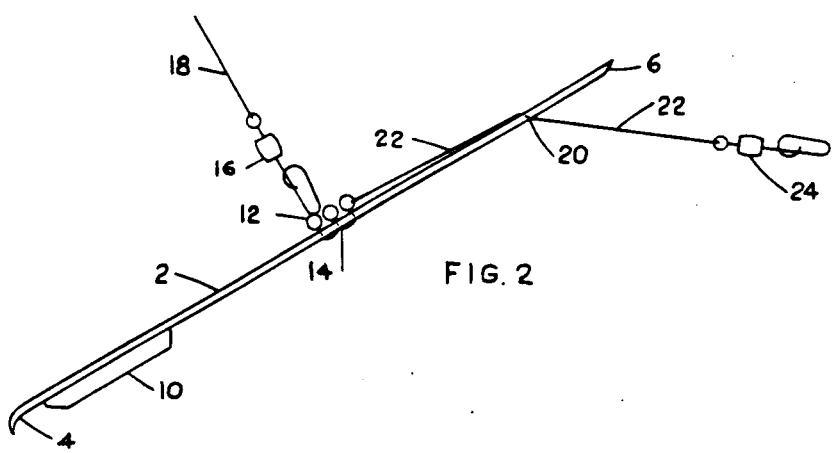
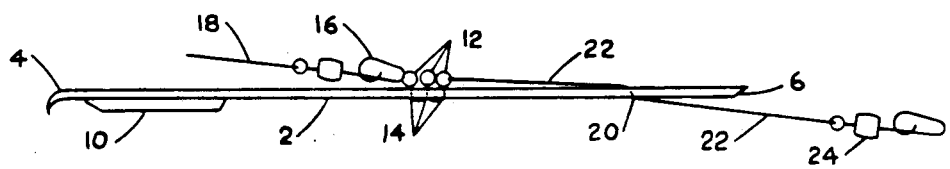
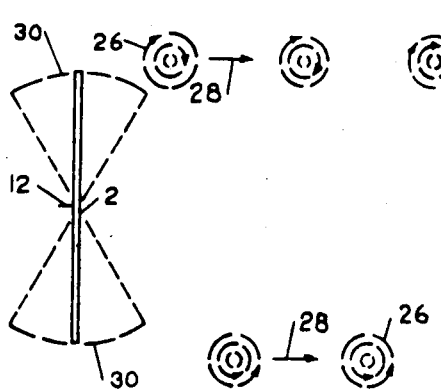
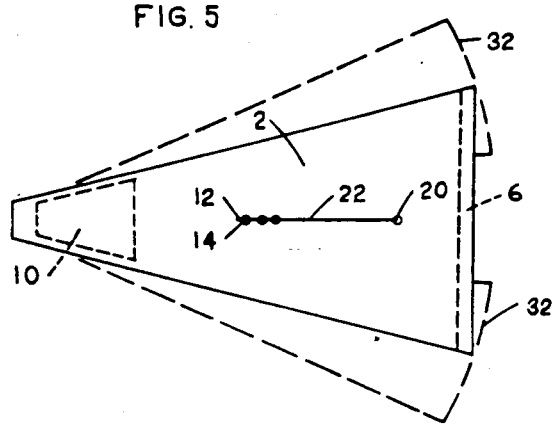

VORTEX DIVER

BACKGROUND-FIELD OF INVENTION

This invention relates to improvements in hydrodynamic shapes and more particularly to improved hydrodynamic shapes suited for use in towed bodies used for fishing.

BACKGROUND-DESCRIPTION OF PRIOR ART

Here to fore, in order to get fishing lures well below the surface, fisherman have used; small lead weights, lead core line, 2 pound to 3 pound lead or cast iron balls with a spring sinker release, plate planer or diving device set at an angle to pull the lure down, and a winch down-rigger device with heavy weights wherein the lure on the fishing line is clipped to the down rigger weight to be released by the pull of the striking fish.

Fish are attracted by various colored spinners, flashers, or dodgers that rotate or oscillate laterally which the fish can see at short distances or that send out sounds or pressure waves which the fish can sense at greater distances. These attractors are attached behind the down pull device along with a bait or lure with hook for the fish to strike.

A significant factor for sports fishing is the freedom of the fish to fight and swim away in order to survive, and for the fisherman to feel his actions in the water. Systems wherein the fish must tow many devices through the water that restrict his action are less enjoyment for the sports fisherman. The system that drops the lead weight and the down-rigger system with the releasing clip offer the most action for the sports fisherman. However, these systems are more expensive to purchase and to use than the other systems so that many fisherman do not use them.

Because of the hydrodynamic drag on lures, attractors, lines, and divers the down pull divers are generally limited to depths of less than about 60 feet. It was recognized from fishing experiences that better divers needed to be developed for greater depths and less restrictions on the fighting fish.

Evaluation of existing divers showed that they operate at about 45 degree angles of attack or body slope angle and employed a towing bail or support above the main diver body and also a lead weight below the body for towing stability. The high bail required a means for tripping to lower the tow point for reduced drug when retrieving the lure and when a fish was being caught. The body shapes were modified rectangular or elliptical with low aspect ratios calculated by dividing the width squared by the body area.

Published hydrodynamic data shows a sudden loss in normal force coefficient at 42 degrees angle of attack from 1.75 to 1.17 with square or circular shapes. Normal force coefficient is defined as normal force divided by the product of one half mass density times velocity squared times area of the body. The loss in normal force coefficient is associated with flow separation at a high angle of attack.

It was believed that a triangular shaped body with a narrow nose bent slightly down would force flow separation at a small angle of attack and would prevent this sudden loss in normal coefficient at desired operating angles of attack. A model was made and tested from several single tow points on the body with the angle of attack varying with the tow point. As expected there was no sudden variation or loss in normal force coefficient. Unexpectedly, the body vibrated rapidly in roll about the body longitudinal center line axis and with lateral tail vibrating in a steady and consistent manner with no indications of angle of attack instability.

Evaluation of these vibrations determined that the vibration frequency corresponded with the natural frequency of a double row vortex trail for bodies with separated flow in accordance with the hydrodynamic Strouhal number. The Strouhal number being defined as vibration frequency times body width divided by velocity. The velocity to use for this calculation is the forward velocity vector normal to the body using the hydrodynamic cross flow principle.

The model test also showed unexpected high towing forces or normal forces at all angles. It was believed that development of this new type of diver could overcome the many shortcomings of existing pull down devices.

OBJECTS AND ADVANTAGES

The primary object of this invention is to increase the sporting enjoyment of fishing by combining the diver and flasher into one unit and thus eliminating one device that the fish must tow and fight against.

Another object of this invention is to develop more efficient divers with greater pull down forces for fishing to greater depths.

Another object of this invention is to provide a new mode of vibration to better simulate a fishtail action to send out pressure waves to attract other fish. Existing attractors either wobble or rotate and are not representative of fish action.

Another object of this invention is to operate in a stable manner over a wide range of angle of attack for towing all sizes of lures having low or high drag resistance.

Other objects of this invention are to provide a body that is easily started in a diving position, a body that can easily be tripped for retrieval to check the lure, a body that will lie flat in line with the fish line when fighting the fish, and a body with minimum attachments that increase hydrodynamic drag.

This invention accomplishes all of the above objects. Other objects and many of the attendant advantages of this invention will be readily appreciated as the same becomes better understood by reference to the following detailed description when considered in connection with the accompanying drawings.

DRAWING FIGURES

Figure 1:
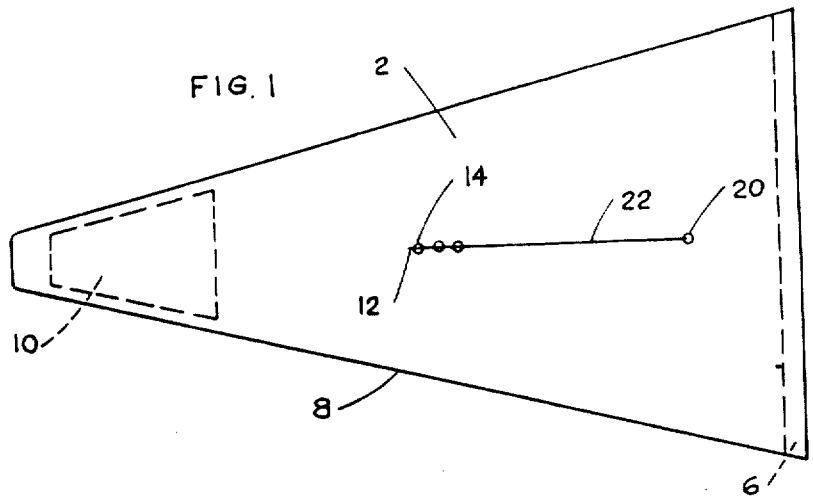
FIG. 1 is a plan view of the vortex diver showing the general shape.

The above figures are representative of the new hydrodynamic principals involved in this invention. Only one typical design of the mechanical features of the diver is presented. This is a preferred design because of its simplicity in relation to existing divers available commercially. This type of diver can be used for a wide variety of fish and fishing conditions. In some cases it might be worthwhile using such things as more complicated spring loaded tripping devices.

REFERENCE NUMERALS IN DRAWINGS

| 2. diver body | 18. fish line |
| 4. curved nose | 20. tail hole |
| 6. bevel tail | 22. lure leader |
| 8. side edges | 24. snap swivel |
| 10. lead ballast weight | 26. generated vortices |
| 12. multiple towing eyes | 28. vortex velocity |
| 14. holes | 30. roll vibration |
| 16. snap swivel | 32. yaw vibrations |

DESCRIPTION—FIG. 1 to 5

Referring to FIG. 1 is shown a typical diver body 2 shape generally triangular form with the leading end or nose cut-off and slightly rounded. The basic triangular form will usually have an aspect ratio from 0.5 to 1. The nose can be sharp in plan form, but because of the possibility of mechanical damage a cut-off width from ¼ inch to 1 inch width is preferred. The straight side edges 8 should not be rounded. Bodies 1/16 inch thick perform well if cut-off square. Bodies ⅛ inch thick or greater should have sharp edges bevelled at approximately 45 degrees.

Figure 2:
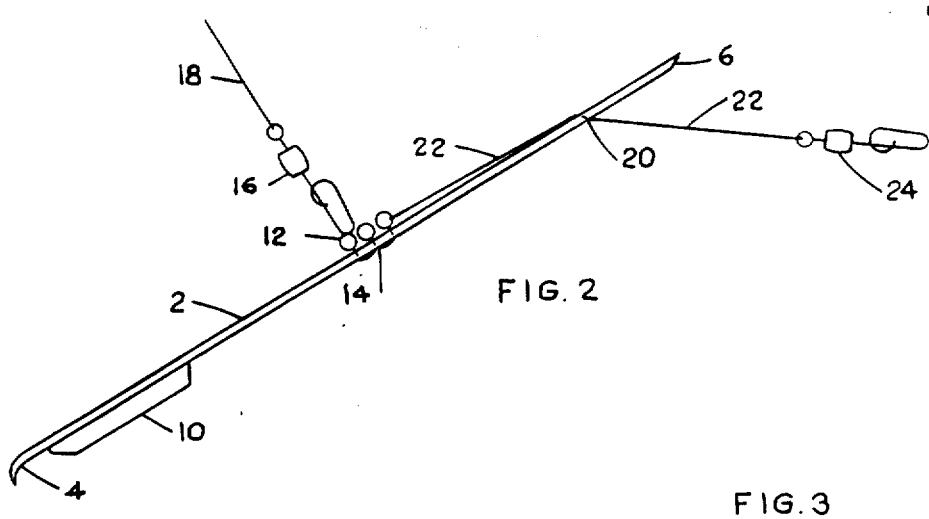
FIG. 2 is a profile view showing the diver in a diving position with a curved nose, attached lead ballast, attached towing eyes, and lines with attachments from the fisherman above and to the lure at the tail.

In FIG. 2 is shown a profile view of the body 2 with the towing and fishing lure fixtures. The curved- nose 4 should extend at least 1/16 inch below the plane of the body. The lower and back side of the curved nose 4 should be sloped approximately 45 degrees relative to the body 2 and have a square or sharp edge. The nose forward and above this corner is rounded to fair in with the upper surface of body 2.

Also shown in FIG. 2 is the bevel tail edge 6 with a thin or sharp edge for good hydrodynamic interaction at the meeting of the flow fields above and below the body 2. The lead ballast weight 10 is fastened solidly to the lower surface of body 2 directly behind the nose 4. The lead can be fastened in several ways including with epoxy type glues, rivets, or glued in pins. When the body 2 is made from molded plastics a flange or lip around the upper edges of the lead can be molded into the body 2.

FIG. 2 shows one preferred method of providing a towing attachment using multiple towing eyes 12 near mid length along the center line axis of the body 2. Small diameter holes 14 are drilled through the body 2 and then a length of small diameter stainless steel wire is threaded through these holes forming loops on the top surface and lying flat along the bottom of the body. The free ends are hooked together to form a strong connection. Other options could be an assembly of eyes fastened to the body or individual eyes with shank or stem inserted through the holes and bolted, riveted or glued to the body 2. Spring loaded tripping devices can also be used.

FIG. 2 also shows conventional fishing line rigging for attaching to the diver using a fish line 18 and snap swivel 16. The snap swivel 16 is connected to any one of the towing eyes 12. Also shown in FIG. 2 is one preferred means of attaching conventional fishing rigging between the diver and the lure using a lure leader 22 and a snap swivel 24. One end of the leader 22 is tied or fastened to the rear towing eye 12. It is passed through a sloping tail hole 20 on the body 2 centerline less than 15 percent of the body length forward of the tail in order to provide towing stability when a fish pulls the body rearward. The snap swivel 24 is attached to a leader to the lure or bait. Other arrangements would be to have the lure leader connected to a hole in the tail or to have the bait hook attached directly to the tail.

Figure 3:
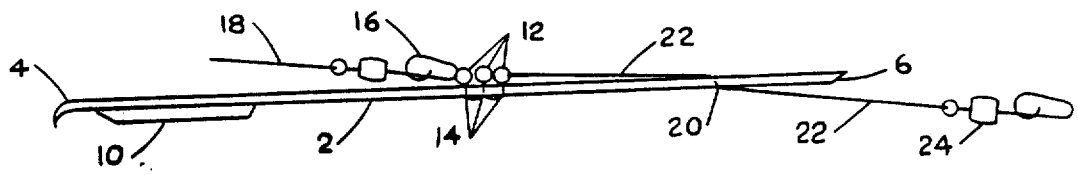
FIG. 3 is profile view similar to FIG. 2 with a fish on and the fisherman pulling showing the lines and diver in a flat position.

FIG. 3 is similar to FIG. 2 except it shows the diver position with a fish on and pulling. Tension in fish line 18 and lure leader line 22 will pull the diver body until it is nearly parallel with the plane of the lines 18 and 22. Existing divers that tow from above the body require a tripping device to achieve this position.

Figure 4:
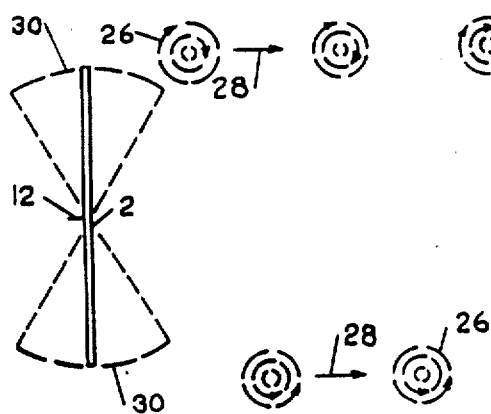
FIG. 4 is an illustration looking from the rear showing the generation and shedding of vortices from each side under the diver which also induce roll vibrations of the diver.
Figure 5:
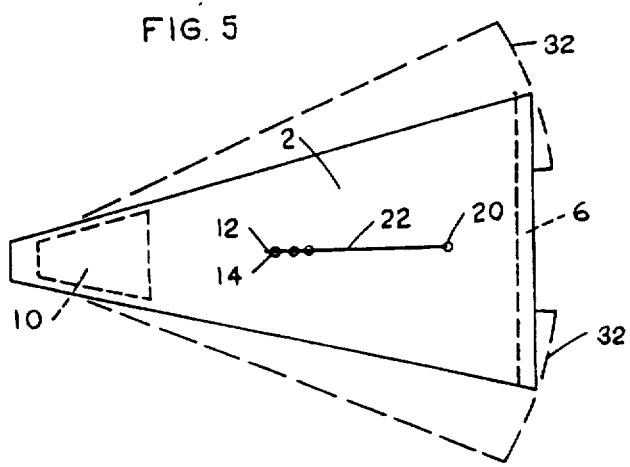
FIG. 5 is an illustration in plan view showing yaw vibrations, induced by the roll vibrations, and centered about a point near the center of gravity of the forward ballast weight.

FIGS. 4 and 5 present schematic arrangements showing the generated vortex street and the action of the diver body 2. FIG. 4 rear view of the diver shows vortices generated from each side edge 8 of the body 2. The vortices periodically shed from the body and move away as shown by vortex velocity 28 arrow. Hydrodynamic forces generated by the vortices vary the pressure on the lower surface of the tail in an alternating fashion to cause roll vibrations 30.

FIG. 5 plan view of the body 2 schematically show the yaw vibrations 32 about an axis nearly vertical from a point near the center of gravity of the lead ballast 10 that are coupled to the roll vibrations 30.

OPERATION

The vortex diver is used by attaching the fishing line to the body tow fitting with a snap swivel and a leader line from the lure to the diver leader snap swivel. The diver is lowered into the water from a moving boat and it quickly attains a diving position. The diving angle of the diver is primarily determined by the location of the tow point and the hydrodynamic drag of the lure.

The drag of the lure stabilizes the diver in yawing. It also produces a pitching moment about the tow point tending to reduce the angle of attack depending upon the towing velocity and drag of the lure.

The center of gravity of the submerged diver using the lead weight is forward near the nose in order to provide dynamic stability when being towed. The lead ballast weight also produces a pitching moment about the tow point that is opposite to the pitching moment of the lure. The lead ballast horizontal lever arm distance from the tow point, varies with the angle of attack and thus varies the pitching moment. Increased lure moment decreases angle of attack and increases the lead weight lever arm and lead pitching moment in the opposite direction. This increased lead pitching moment reduces the angle of attack change tending to be caused by the lure.

The diver body is towed from a point that is slightly forward of the center of the normal hydrodynamic force. The tow line would be perpendicular to the diver body if there was no body frictional drag and hydrodynamic drag of attached fittings and lures. Existing divers operate approximately 5 degrees to 10 degrees from this vertical. The vortex diver with minimum appendages operates within 1 degree or 2 degrees of the perpendicular unless a very high drag lure is used.

The center of the normal force moves slightly forward with decreasing angle of attack and the magnitude of the normal force is less with decreasing angle of attack. These changes in center of the normal force and change in the magnitude of the force also counteract any changes in pitching moment caused by the lure.

Similar considerations are made in determining the size of the lead ballast weight so that the tow point is close to the center of the normal force and variations in the towing velocity and variations in the normal force will produce only small changes in angle of attack.

The result of the above design considerations is to have a towed body that has changes in angle of attack of low acceptable values for a wide range of towing conditions.

An important consideration for divers that must operate in waves is the orbital velocity of the wave particles. Orbital velocities combined with towing velocities can produce a significant change in the direction and velocity of the water relative to the diver. The true angle of attack of the diver can change as much as 10 degrees in larger waves and moderate towing depths. The vortex diver operational and stability characteristics will accept these changes caused by waves.

Existing flat plate divers have flow separation at the nose and then re-attachment towards the rear and can react adversely to angle of attack variation such as that encountered in waves. The shape of the nose is very important in determining flow separation and also pressure distributions about the whole body.

The curved down nose of the vortex diver forces flow separation at the nose that can not re-attach and cause a reduction of angle of attack of 10 degrees to 15 degrees when used at low angles. It also prevents unfavorable reactions when bodies having aspect ratios near 1 operate at 45 degrees and have major changes in normal forces.

The curved down nose produces a small increase in hydrodynamic drag at the nose, but the overall operational performance is greatly improved because of this nose shape.

Divers tested having a flat nose also vibrate, but in operation they consistently reduce angle of attack about 10 degrees to 15 degrees after a short towing distance. In a few applications where strong down forces are not needed the flat nose diver can be used.

The center of the normal force for vortex divers is approximately 0.6 times the length of the triangular body from the nose and it shifts slightly forward for reduced angle of attack. The location also varies slightly with aspect ratio, nose cut off length, and the condition of the side bevels.

It is believed that divers used for greater depths will operate in the range of 25 degrees to 45 degrees angle of attack. Lower angles have lower normal force coefficients and thus will require larger area divers for a desired down force. Above 45 degrees much longer fishing lines are necessary in order to reach desired depths.

Low aspect ratio flat plates, especially of triangular or delta form have been found to be more efficient than profiled wing shapes. Adequate hydrodynamic theory is available for calculating performance up to approximately 30 degrees angle of attack. The theory is not correct at higher angles and model tests must be made to determine performance.

One component in calculating normal forces results from deflecting a stream of fluid at an upward angle. A second component deflects the flow laterally around the side edges and is known as the cross flow term.

Above 30 degree angle of attack this second term can be greater than the first component. Sharp cornered lateral edges are used to attain the best performance for this second term.

In order to evaluate and develop this diver concept, towed tests were performed on many models of various sizes, aspect ratios, towing locations, towing attachments, nose variations, tail variations, edge conditions, and ballast weight sizes and locations. Tests were made over a range of towing velocities at angles of attack up to 60 degrees while towing various lures now used in practice.

The test results show that the vortex diver produces much greater fishing line pull per unit area than existing divers. In addition, the vortex divers vibrate and do not encounter any unstable conditions at angles of attack up to 60 degrees.

The vortex diver successfully combines a better down pull device with a vibrating device for attracting fish in one unit. It is not necessary to tow a separate oscillating or spinning attractor which will have greater overall towing drag. Thus, diver depth and fishing capabilities are increased with fewer objects for the fish to tow. The fisherman will have more sporting enjoyment.

The vortex divers have been observed vibrating at a frequency of approximately 1 cycle per second to 3 cycles per second, depending upon towing speed, the size of the diver, and the angle of attack. Noted vibration frequency increased with towing speed, decreased with the width of the diver, and decreased with angle of attack, all in accordance with the factors of the Strouhal number used in calculating frequency.

The back and forth motions of the vortex diver side edges better simulates the action of a fish tail in sending out pressure waves that attract fish. Existing fish attractors either oscillate like a dodger or spoon or else spin like a flasher or spinner. It is believed that the vortex diver provides a new and better type of motion for attracting fish.

Vortex divers with the tow point on or close to the body perform best. A fixed bail with an elevated tow point reduces vibration amplitude and will retard or prevent the formation of the natural vibrations. Even though the vortex trail is being generated, the diver might not be able to respond to initiate vibrations.

Roll vibrations about the centerline axis are approximately 50 degrees in amplitude. Yaw vibrations about the forward ballast weight have been noted up to approximately one fourth the tail width in amplitude. These two vibrations are coupled. It is believed that roll is generated by varying pressures of the vortices on the lower side of the body. The subsequent lateral forces and yaw result from the changing lateral slope with roll which deflect fluid flow from side to side.

It is believed that the significant improvement in pulling force of the vortex diver is caused by the curved down narrow nose and the vibration velocities of the lateral edges and tail.

A triangular body with a sharp nose in effect has approximately two dimensional flow when moving forward. Most of the flow is around the sides when separated flow on the bottom is present. The curved down nose prevents re-attachment of axial flow and adverse interactions of the axial flow and lateral flow that is typically encountered with square or round plates at approximately 45 degrees angle of attack.

Hydrodynamic forces are a function of velocity squared. The roll and vibration velocities of the body, when combined with the forward towing velocity produce greater velocity vectors. Velocities of the side edges that vibrate up and down combined with the forward velocity cross flow vector provide an effective alternating velocity vector with the maximum much larger than the towing velocity vector. A similar situation occurs in electrical engineering principles for effective heating value of an alternating current which is a function of the current squared. The average value of the current is 0.5 of the maximum current. The effective current is 0.707 of the maximum current or 41 percent more than the average.

Published data on hydrodynamic drag test for round plate sea anchors at 90 degrees angle of attack show a normal force coefficient of 1.14 on a tow rod and 1.80 on a tow line. The high force coefficient on the tow line is explained as caused by its wiggling and swaying motions. Tests on parachutes also show similar results of 1.26 for restrained, 1.60 for oscillating, and 2.40 for gliding.

It is believed that the yaw vibrations could also have a velocity squared effect for increasing the vortex diver pull. Also, the coupled yaw and roll motions are similar to the sculling action of propelling a boat with a single oar pivoted at the stern. Another possibility is that yaw vibrations in effect enable the body to act on a wider stream tube that is deflected to produce the diving force.

Changes can be made in the physical form and arrangements of this invention without departing from the hydrodynamic principles set forth above. The body can have some curvature and such items as a small bridle or a small rod bail can be used in some applications, but these are not preferred methods.

The body can be made from various plain or colored plastics such as acrylic, polycarbonate or polypropylene, with removable plastic tapes or applied paint. Metals such as brass with reflective coatings can also be used. The diver can be adapted for towing laterally from the center line of the boat by providing additional towing line or lure leader attachment locations off from the center line of the diver.

The vortex diver can be used with modifications and without attached lures such as a replacement for the heavy weight used on down rigger devices. Other applications for the hydrodynamic principles would be adaptations for fishing otter boards, sea anchors, paravanes, and even rudders, sails, and heavily loaded propeller blades.

I claim:

1. A thin substantially triangular hydrodynamic fishing lure comprising:
   a pointed, narrow nose having a squared or sharp edge which is curved to form an angle at least 45 degrees away from the plane of the body of said lure at a leading edge; said leading edge being offset from said plane and extending at least 1/16 inch below said plane to force flow separation at said leading edge; whereby said lure can be operated over a wide range of angles in a stable condition with improved hydrodynamic forces.

2. A hydrodynamic fishing lure as in claim 1 wherein said lure is provided with two side edges joined to a beveled tail edge; thereby forming sharp corners at each joint.

3. A hydrodynamic fishing lure as in claim 2 comprising:
   a) a ballast weight mounted forward on the underside of said body close to said curved nose;
   b) a towing line attachment and adjustment means for attaching a towing line at various fixed location on or near the top surface of said body;
   c) line attachment means for attaching fishing devices near said beveled tail edge; whereby said lure vibrates and produces great down pull; produces pressure waves in the water to attract fish, and which may be operated in a wide range of operating limits of speed, angle of attack, and wave conditions in a stable condition when towing various devices.

4. A hydrodynamic fishing lure as in claim 2 comprising:
   a) a ballest weight mounted forward on the underside of said body close to said curved nose;
   b) a towing line attachment and adjustment means for attaching a towing line at various fixed location on or near the top surface of said body;
   c) line attachment means for attaching fishing devices near said beveled tail edge;
   d) said body is clear or of various colors or fitted with reflective material; whereby said lure vibrates and produces great down pull; produces visual reflections to attract fish, and which may be operated in a wide range of operating limits of speed, angle of attack, and wave conditions in a stable condition when towing various devices.

* * * * *

UNITED STATES PATENT AND TRADEMARK OFFICE
CERTIFICATE OF CORRECTION

PATENT NO. : 5,020,267

DATED : June 04, 1991

INVENTOR(S) : Francis R. Rasmussen

It is certified that error appears in the above-identified patent and that said Letters Patent is hereby corrected as shown below:

The sheet of drawing consisting of Figs. 1-5 should be added as shown on the attached sheet.

Signed and Sealed this

Nineteenth Day of November, 1991

*Attest:*

HARRY F. MANBECK, JR.

*Attesting Officer*  *Commissioner of Patents and Trademarks*